United States Patent
Yao

(10) Patent No.: US 11,085,146 B2
(45) Date of Patent: Aug. 10, 2021

(54) PANTS SEAM CLAMPING STRUCTURE FOR NOVEL HANDHELD GARMENT STEAMER

(71) Applicant: NINGBO HEIGER ELECTRICAL APPLIANCES CO LTD, Ningbo (CN)

(72) Inventor: Nengyi Yao, Ningbo (CN)

(73) Assignee: Ningbo Heiger Electrical Appliances Co. Ltd., Ningbo (CN)

(*) Notice: Subject to any disclaimer, the term of this patent is extended or adjusted under 35 U.S.C. 154(b) by 132 days.

(21) Appl. No.: 16/681,768

(22) Filed: Nov. 12, 2019

(65) Prior Publication Data
US 2020/0149214 A1 May 14, 2020

(30) Foreign Application Priority Data
Nov. 14, 2018 (CN) .......................... 201811355493.5

(51) Int. Cl.
*D06F 73/00* (2006.01)
*D06F 59/02* (2006.01)
*F16B 2/02* (2006.01)

(52) U.S. Cl.
CPC .............. *D06F 73/00* (2013.01); *D06F 59/02* (2013.01); *F16B 2/02* (2013.01)

(58) Field of Classification Search
CPC .......... D06F 73/00; D06F 75/20; D06F 75/22; D06F 59/02; F16B 2/02; F16B 2/10; F16B 2/12
See application file for complete search history.

(56) References Cited

U.S. PATENT DOCUMENTS

| | | | | | |
|---|---|---|---|---|---|
| 1,095,925 | A | * | 5/1914 | Pogue | A47G 25/72 38/71 |
| 2,487,657 | A | * | 11/1949 | Larson | D06F 87/00 223/73 |
| 2,727,130 | A | * | 12/1955 | Witt | A47G 25/72 38/71 |
| 3,577,859 | A | * | 5/1971 | Davidson | D06F 75/30 38/71 |
| 3,921,648 | A | * | 11/1975 | Barradas | A45D 2/22 132/228 |

(Continued)

FOREIGN PATENT DOCUMENTS

| | | |
|---|---|---|
| CN | 202039222 U | 11/2011 |
| CN | 203096478 U | 7/2013 |

*Primary Examiner* — Ismael Izaguirre
(74) *Attorney, Agent, or Firm* — Jingfeng Song; SciNova IP and Regulatory Consulting LLC

(57) ABSTRACT

The present disclosure provides a pants seam clamping structure for novel handheld garment steamer. The structure comprises an auxiliary steam outlet for ironing pants seams, a pants clamping plate for pressing the garments, and a steam generator and a main steam outlet, both of which are arranged in the handheld garment steamer. The auxiliary steam outlet comprises a vaporization cover, a pants clamping tube connector provided with an inner hole, a sealing plug provided with an inner hole, and a top cover of the garment steamer. The pants clamping plate comprises a rotary shaft bracket, a rotary shaft, a torsion spring used for providing a torsional force, and a pressing plate used for pressing and fixing the garment. The present disclosure provides independent auxiliary steam outlet and steam channel which has good sealing performance and stable structure.

4 Claims, 2 Drawing Sheets

(56) References Cited

U.S. PATENT DOCUMENTS

| | | | | |
|---|---|---|---|---|
| 4,817,309 A * | 4/1989 | Frank | ............... | D06F 75/30 |
| | | | | 38/15 |
| 9,822,480 B2 * | 11/2017 | Fung | ............... | D06F 87/00 |
| 2010/0058623 A1 * | 3/2010 | Fernandez | ............... | D06F 71/18 |
| | | | | 38/14 |
| 2010/0199528 A1 * | 8/2010 | Fabrikant | ............... | D06F 71/32 |
| | | | | 38/15 |
| 2015/0082839 A1 * | 3/2015 | Holm | ............... | D06F 73/00 |
| | | | | 68/5 R |
| 2016/0053430 A1 * | 2/2016 | Chua | ............... | D06F 75/30 |
| | | | | 68/5 A |

\* cited by examiner

PANTS SEAM CLAMPING STRUCTURE FOR NOVEL HANDHELD GARMENT STEAMER

CROSS REFERENCE TO RELATED PATENT APPLICATIONS

This application claims priority to Chinese Patent Application No. 201811355493.5, filed on Nov. 14, 2018, entitled "PANTS SEAM CLAMPING STRUCTURE FOR NOVEL HANDHELD GARMENT STEAMER", which is hereby incorporated by reference in its entirety.

TECHNICAL FIELD

The present application relates to the field of garment steamers, and in particular, to pants seam clamping structure for novel handheld garment steamers.

BACKGROUND

Handheld garment steamers are portable and take up little space. They are capable of generating a large amount of steam and have good ironing effect, so they are becoming more and more popular among customers, particularly urban white-collar workers. This disclosure relates to a pants seam clamping structure for handheld garment steamer.

Handheld garment steamers are mainly used for ironing garments by steam. When the fabric is penetrated by high-temperature steam, its internal molecular structure will resume to its original configuration, and macroscopically, all the wrinkles on the garments will stretch out, so that an ironing effect required by the consumer is fulfilled. However, since handheld garment steamers generally suspend the garments for ironing, it is difficult to obtain straight pants seam and neckline.

SUMMARY

In view of the current situation of the prior art, the technical issue to be solved by the present disclosure is to provide a pants seam clamping structure for novel handheld garment steamers, to solve the problem that it is difficult to obtain straight pants seam and neckline by handheld garment steamer.

To solve the above technical issue, the present disclosure provides a pants seam clamping structure for novel handheld garment steamer, including:

an auxiliary steam outlet for ironing pants seams;
a pants clamping plate for pressing garments; and
a steam generator and a main steam outlet, both of which are arranged in the handheld garment steamer;
wherein the auxiliary steam outlet comprises:
an independent steam channel through which steam is sprayed to iron the pants seam;
a vaporization cover;
a pants clamping tube connector provided with an inner hole;
a sealing plug provided with an inner hole; and
a top cover of the garment steamer;
wherein the pants clamping tube connector is fixedly riveted to the vaporization cover;
wherein the pants clamping plate comprises:
a rotary shaft bracket;
a rotary shaft;
a torsion spring used for providing a torsional force; and
a pressing plate used for pressing and fixing the garment;
wherein, under the effect of the torsional force from the torsion spring, the pressing plate presses against the top end of the sealing plug, so that steam is prevented from being sprayed out via the auxiliary steam outlet;
wherein the rotary shaft bracket is fixed to the top cover of the garment steamer by a screw;
wherein the pressing plate, the torsion spring, and the rotary shaft bracket are connected together through their central holes by the rotary shaft.

Preferably, the outer surface of the top of the pants clamping tube connector forms an interference fit with the inner surface of the bottom of the sealing plug, ensuring that the steam channel formed by the inner hole of the pants clamping tube connector and the inner hole of the sealing plug has good sealing performance.

Preferably, the top of the sealing plug is provided with an outer annular groove, and the sealing plug is fixedly embedded into a corresponding hole of the top cover of the garment steamer by the outer annular groove.

Preferably, the pressing plate comprises:
a pants seam pressing part located at the front end of the pressing plate and used for contacting and pressing the garment;
a connecting part located in the middle of the pressing plate and used for connecting the front end and the rear end of the pressing plate; and
a thumb pressing part located at the rear end of the pressing plate;
wherein, when the thumb pressing part is pressed by thumb, the pants seam pressing part tilts upwards under the effect of the rotation center fulcrum of the rotary shaft, and an opening for inserting the garment to be squeezed therein is formed between the pants seam pressing part and the top cover of the garment steamer.

Beneficial effects: the present disclosure provides independent auxiliary steam outlet and its steam channel has good sealing performance and stable structure. Combing with the pants seam clamping structure which is integrated with the garment steamer, the structure is simple, practical, and safe. Both the portability and ironing efficiency of the handheld garment steamer are improved while the pants seam ironing effect is ensured. The present disclosure solves the problem that it is difficult to obtain straight pants seam by means of general handheld garment steamer.

Figure 1:
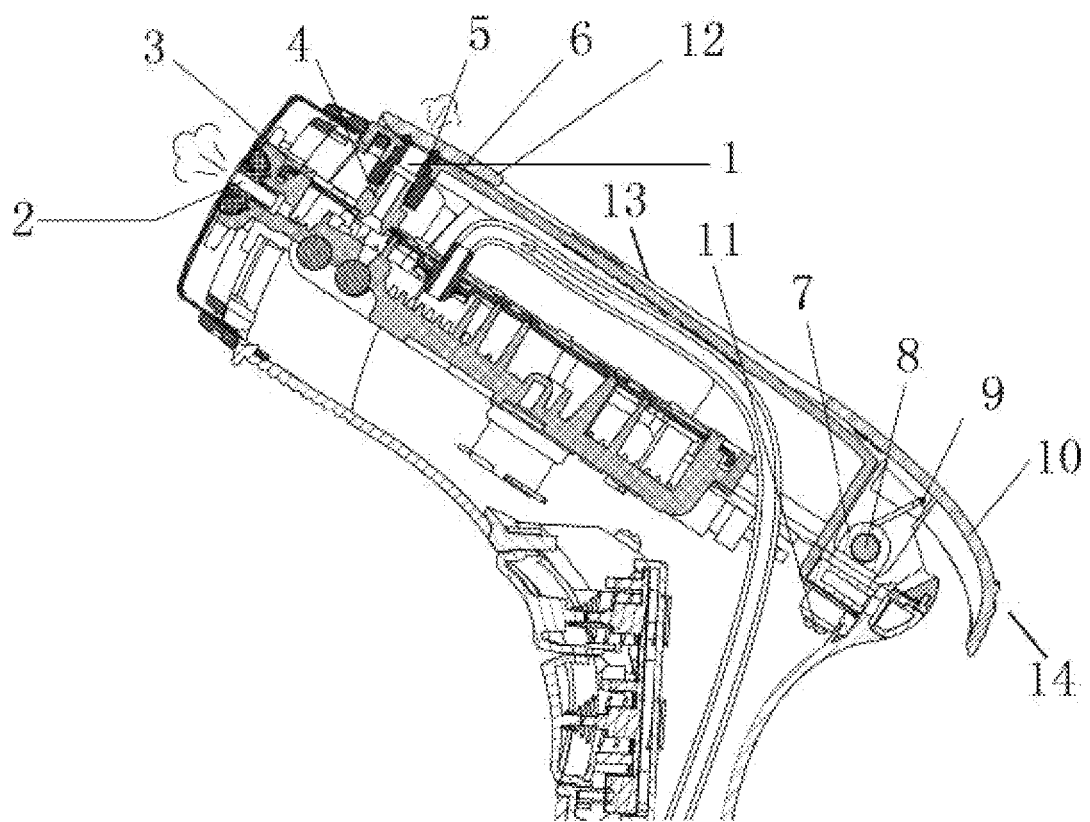
FIG. 1 is a structural diagram of the present disclosure.
Figure 2:
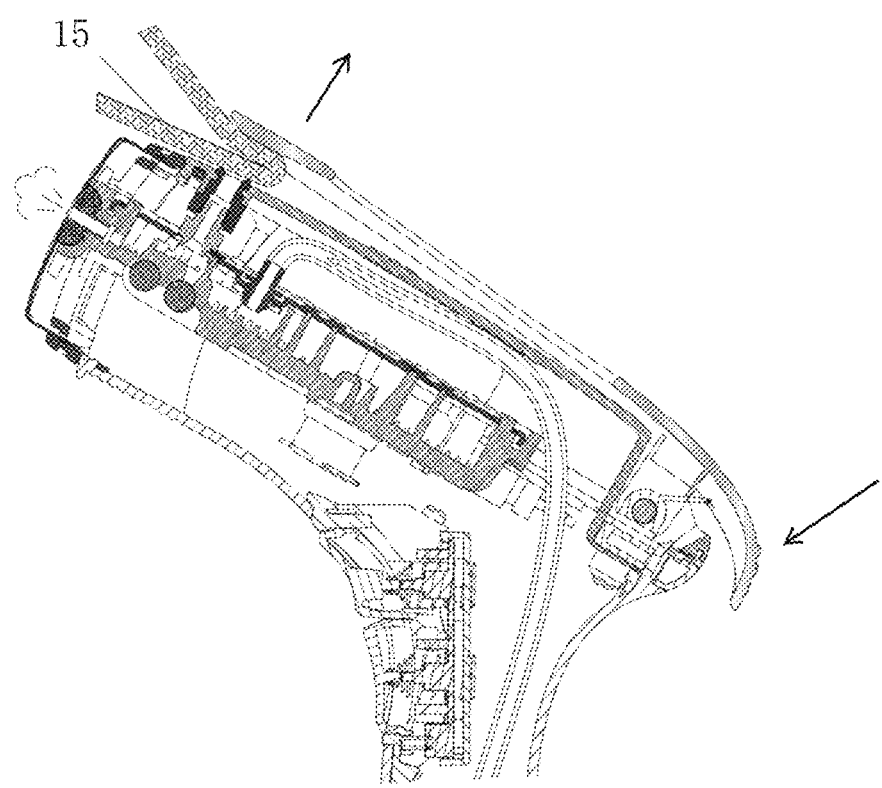
FIG. 2 is a schematic diagram of the operating state of the present disclosure.

Reference characters: auxiliary steam outlet 1; main steam outlet 2; vaporization cover 3; pants clamping tube connector 4; sealing plug 5; top cover of garment steamer 6; rotary shaft support 7; rotary shaft 8; torsion spring 9; pressing plate 10; screw 11; pants seam pressing part 12; connecting part 13; thumb pressing part 14; garment 15.

DETAILED DESCRIPTION

For a further understanding of the structural characteristics and effects of the present disclosure, detailed description, exemplary embodiments and accompanying drawings are as follows.

A pants seam clamping structure for novel handheld garment steamer, comprising:
an auxiliary steam outlet 1 for ironing pants seams;
a pants clamping plate for pressing garments 15; and a steam generator and a main steam outlet 2, both of which are arranged in the handheld garment steamer;

wherein the auxiliary steam outlet 1 comprises:

an independent steam channel through which steam is sprayed to iron the pants seam;

a vaporization cover 3;

a pants clamping tube connector 4 provided with an inner hole;

a sealing plug 5 provided with an inner hole; and a top cover of the garment steamer 6;

wherein the pants clamping tube connector 4 is fixedly riveted to the vaporization cover 3;

wherein the pants clamping plate comprises:

a rotary shaft bracket 7;

a rotary shaft 8;

a torsion spring 9 used for providing a torsional force; and a pressing plate 10 used for pressing and fixing the garment 15;

wherein, under the effect of the torsional force from the torsion spring 9, the pressing plate 10 presses against the top end of the sealing plug 5, so that steam is prevented from being sprayed out via the auxiliary steam outlet 1;

wherein the rotary shaft bracket 7 is fixed to the top cover of the garment steamer 6 by a screw 11;

wherein the pressing plate 10, the torsion spring 9, and the rotary shaft bracket 7 are connected together through their central holes by the rotary shaft 8.

Furthermore, the outer surface of the top of the pants clamping tube connector 4 forms an interference fit with the inner surface of the bottom of the sealing plug 5, ensuring that the steam channel formed by the inner hole of the pants clamping tube connector 4 and the inner hole of the sealing plug 5 has good sealing performance.

Furthermore, the top of the sealing plug 5 is provided with an outer annular groove, and the sealing plug is fixedly embedded into a corresponding hole of the top cover of the garment steamer 6 by the outer annular groove.

Furthermore, the pressing plate 10 comprises:

a pants seam pressing part 12 located at the front end of the pressing plate and used for contacting and pressing the garment 15;

a connecting part 13 located in the middle of the pressing plate and used for connecting the front end and the rear end of the pressing plate; and a thumb pressing part 14 located at the rear end of the pressing plate;

wherein, when the thumb pressing part 14 is pressed by thumb, the pants seam pressing part 12 tilts upwards under the effect of the rotation center fulcrum of the rotatory shaft 8, and an opening for inserting the garment 15 to be squeezed therein is formed between the pants seam pressing part and the top cover of the garment steamer 6.

Particularly, when the pants clamping function of the handheld garment steamer is not needed by user, the pressing plate is pressed against the top end of the sealing plug under the effect of the torsional force from the torsion spring in the pants clamping plate, so that steam can only be sprayed out via the main steam outlet and can be prevented from being sprayed out via the auxiliary steam outlet. When the pants clamping function of the handheld garment steamer is needed by user, the user can hold the garment steamer and press the thumb pressing part of the pressing plate with thumb, then the pants seam pressing part tilts upwards under the effect of the rotation center fulcrum of the rotatory shaft. Insert a garment which needs to obtain pants seam in the opening formed between the pressing plate and the top cover of the garment steamer, in this situation, part of the steam is sprayed out via the auxiliary steam outlet. The fiber is penetrated by steam and under pressure of the pressing plate at the same time. Straight pants seam can be obtained when the garment steamer is dragged horizontally.

The present disclosure provides independent auxiliary steam outlet and its steam channel has good sealing performance and stable structure. Combing with the pants seam clamping structure which is integrated with the garment steamer, the structure is simple, practical, and safe. Both the portability and ironing efficiency of the handheld garment steamer are improved while the pants seam ironing effect is ensured. The present disclosure solves the problem that it is difficult to obtain straight pants seam by means of general handheld garment steamers.

What should be pointed out is that the terms such as "first" and "second" in this specification are only used for distinguishing one entity or operation from another and do not require or indicate that these entities or operations have any actual relation or sequence. The term "comprise", "include", or any other variation intended to express non-exclusive inclusion indicates that a progress, method, article, or device including a series of elements not only includes these elements listed, but also includes other elements not clearly listed or inherent elements of the process, method, article or device.

Finally, the above embodiments are only used for explaining the technical solution of the disclosure, and not intended to limit the disclosure. Although the disclosure is detailed with reference to the above embodiments, those skilled in the art would appreciate that the technical solution of the embodiments can be modified, or part of the technical characteristics of the embodiments can be equivalently replaced without deviating from the spirit of the technical solution of the embodiments of the disclosure or going beyond the scope of the disclosure.

What is claimed is:

1. A pants seam clamping structure for novel handheld garment steamer, comprising:

an auxiliary steam outlet for ironing pants seams;

a pants clamping plate for pressing garments; and a steam generator and a main steam outlet, both of which are arranged in the handheld garment steamer;

wherein the auxiliary steam outlet comprises:

an independent steam channel through which steam is sprayed to iron the pants seam;

a vaporization cover;

a pants clamping tube connector provided with an inner hole;

a sealing plug provided with an inner hole; and a top cover of the garment steamer;

wherein the pants clamping tube connector is fixedly riveted to the vaporization cover;

wherein the pants clamping plate comprises:

a rotary shaft bracket;

a rotary shaft;

a torsion spring used for providing a torsional force; and a pressing plate used for pressing and fixing the garment;

wherein, under the effect of the torsional force from the torsion spring, the pressing plate presses against the top end of the sealing plug, so that steam is prevented from being sprayed out via the auxiliary steam outlet;

wherein the rotary shaft bracket is fixed to the top cover of the garment steamer by a screw;

wherein the pressing plate, the torsion spring, and the rotary shaft bracket are connected together through their central holes by the rotary shaft.

2. The clamping structure of claim 1, wherein the outer surface of the top of the pants clamping tube connector forms an interference fit with the inner surface of the bottom of the sealing plug, ensuring that the steam channel formed by the inner hole of the pants clamping tube connector and the inner hole of the sealing plug has good sealing performance.

3. The clamping structure of claim 1, wherein the top of the sealing plug is provided with an outer annular groove, and the sealing plug is fixedly embedded into a corresponding hole of the top cover of the garment steamer by the outer annular groove.

4. The clamping structure of claim 1, wherein the pressing plate comprises:
- a pants seam pressing part located at the front end of the pressing plate and used for contacting and pressing the garment;
- a connecting part located in the middle of the pressing plate and used for connecting the front end and the rear end of the pressing plate; and
- a thumb pressing part located at the rear end of the pressing plate;
- wherein, when the thumb pressing part is pressed by thumb, the pants seam pressing part tilts upwards under the action of the rotation center fulcrum of the rotary shaft, and an opening for inserting the garment to be squeezed therein is formed between the pants seam pressing part and the top cover of the garment steamer.

* * * * *